(12) United States Patent
Bitzl et al.

(10) Patent No.: US 8,967,877 B2
(45) Date of Patent: Mar. 3, 2015

(54) BEARING ARRANGEMENT

(75) Inventors: Jürgen Bitzl, Bergrheinfeld (DE); Burkhard Buchheim, Schweinfurt (DE); Alexander Dilje, Schweinfurt (DE); Helmut Hauck, Euerbach (DE); Stefanie Seufert, Rothhausen (DE)

(73) Assignee: Aktiebolaget SKF, Gothenburg (SE)

( * ) Notice: Subject to any disclaimer, the term of this patent is extended or adjusted under 35 U.S.C. 154(b) by 33 days.

(21) Appl. No.: 13/512,367

(22) PCT Filed: Nov. 25, 2010

(86) PCT No.: PCT/EP2010/068168
§ 371 (c)(1),
(2), (4) Date: Aug. 10, 2012

(87) PCT Pub. No.: WO2011/067152
PCT Pub. Date: Jun. 9, 2011

(65) Prior Publication Data
US 2012/0314986 A1  Dec. 13, 2012

(30) Foreign Application Priority Data

Dec. 2, 2009 (DE) .......................... 10 2009 056 526

(51) Int. Cl.
| | |
|---|---|
| F16C 43/00 | (2006.01) |
| F16C 43/04 | (2006.01) |
| F16C 19/54 | (2006.01) |
| F16C 35/067 | (2006.01) |
| F16C 35/04 | (2006.01) |
| F16C 33/58 | (2006.01) |

(52) U.S. Cl.
CPC ............... *F16C 19/54* (2013.01); *F16C 35/067* (2013.01); *F16C 35/042* (2013.01); *F16C 35/045* (2013.01); *F16C 33/586* (2013.01); *F16C 2361/61* (2013.01)
USPC .......................................... 384/539; 384/585

(58) Field of Classification Search
CPC ...... F16C 19/54; F16C 35/067; F16C 35/045; F16C 35/042
USPC ......... 384/537, 538, 539, 559, 561, 584, 585, 384/903, 906, 456
See application file for complete search history.

(56) References Cited

U.S. PATENT DOCUMENTS

| | | | | |
|---|---|---|---|---|
| 4,138,168 | A | * | 2/1979 | Herlitzek ...................... 384/537 |
| 6,106,155 | A | * | 8/2000 | Beyfuss et al. ................ 384/537 |
| 6,505,973 | B2 | * | 1/2003 | Buchheim et al. ............ 384/537 |
| 6,652,150 | B2 | * | 11/2003 | Buchheim et al. ............ 384/537 |

FOREIGN PATENT DOCUMENTS

| | | |
|---|---|---|
| CH | 426387 A | 12/1966 |
| DE | 676233 C | 5/1939 |
| DE | 1525320 A1 | 9/1969 |
| EP | 2006561 A1 | 12/2008 |
| EP | 2009302 A2 | 12/2008 |
| FR | 2468783 A1 | 5/1981 |
| JP | 2003194080 A | 7/2003 |
| WO | WO2011004760 A1 | 1/2011 |

* cited by examiner

*Primary Examiner* — James Pilkington
(74) *Attorney, Agent, or Firm* — Bryan Peckjian; SKF USA Inc. Patent Depart.

(57) ABSTRACT

A bearing assembly includes a bearing support having at least one bearing and at least one receptacle for at least one outer ring of the at least one bearing. The outer ring of the bearing has at least one annular groove, into which a snap ring is inserted relative to the bearing support in order to axially fix the outer ring. At least one alignment element is disposed on or in the bearing support. The snap ring is retained by alignment element relative to the bearing support at a defined angle relative to the rotational axis of the bearing.

13 Claims, 7 Drawing Sheets

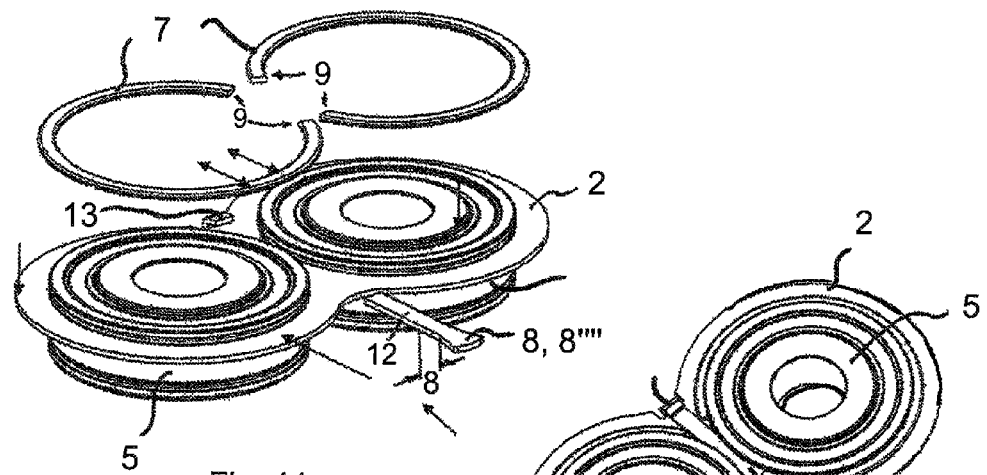
Fig. 11
Fig. 12
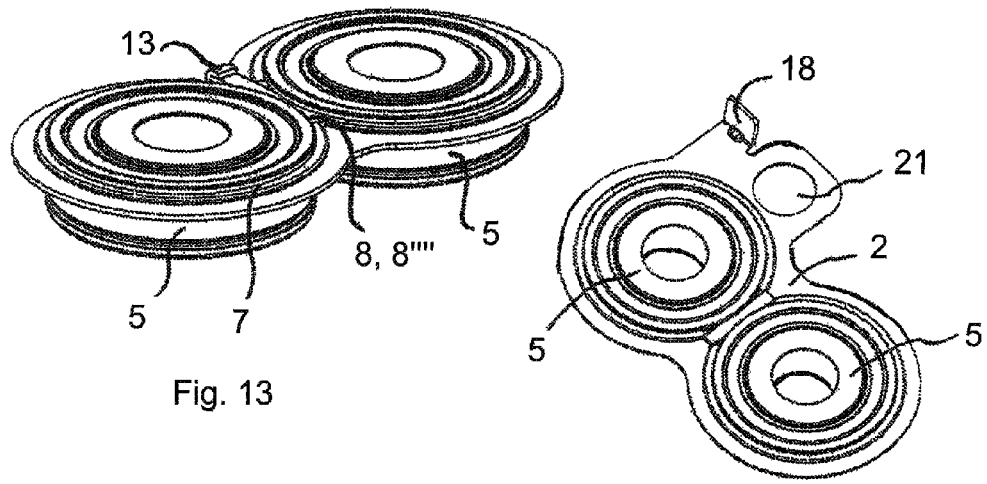
Fig. 13
Fig. 14

BEARING ARRANGEMENT

CROSS-REFERENCE

This application is the U.S. National Stage of International Application No. PCT/EP2010/068168 filed on Nov. 25, 2010, which claims priority to German patent application no. 10 2009 056 526.4 filed on Dec. 2, 2009.

TECHNICAL FIELD

The invention relates to a bearing assembly comprising a bearing support having at least one receptacle for at least one outer ring of a bearing and at least one bearing, wherein the outer ring of the bearing has at least one annular groove, into which a snap ring is inserted relative to the bearing support for the purpose of axially fixing the outer ring.

RELATED ART

Bearing assemblies of this type are well known in the prior art. In particular, they are utilized to implement the bearing for two radially closely spaced transmission shafts that extend in parallel to each other in a transmission housing. For this purpose, a support plate is in most cases provided with two receptacles, e.g., circular cut-outs, for the bearing outer rings; the bearing outer rings and thus the bearings are then fixed relative to the bearing support, for example, by snap rings that extend into circumferential annular grooves in the bearing outer rings. A unit is thus created that can be installed in the transmission housing in a simple way. The bearing support does not necessarily have to transmit bearing loads during the subsequent operation; it can also be utilized as a pure retainer for the bearings until the bearings are set in the housing, namely in corresponding transmission bores. However, it is also possible that the bearing support is designed in a way so that it can support and transmit bearing loads during the operation of the bearings.

When bearings are retained in the bearing support by snap rings, it is sometimes perceived as disadvantageous, for instance, from the standpoint of noise development, that the snap rings exhibit a certain movability in the circumferential direction and can rotate in their annular groove about the rotational axis of the bearing. This is particularly the case if the circumferential angle, over which the snap rings extend, is significantly less than 360.degree. (e.g.,) 330.degree.), which can be required when two to-be-supported bearings advance close to each other in the radial direction. In certain circumstances the area, in which the two bearings advance close to each other, must remain free of the snap rings. In these circumstances, a movement of the snap rings in their annular grooves cannot be reliably excluded.

SUMMARY

It is therefore an object of the present teachings to disclose a bearing assembly that reliably prevents an undesirable movability of the snap rings in their annular grooves of the bearing rings during the operation of the bearing assembly, preferably in a simple and cost-effective way.

In one aspect of the present teachings, at least one alignment element is disposed on or in the bearing support, and the alignment element retains the snap ring relative to the bearing support at a defined angle relative to the rotational axis of the bearing.

According to a first development, the alignment element can be formed as an elevation, which is disposed on the surface of the bearing support and which elevation forms an abutment surface for a circumferential end of the snap ring. The elevation can be formed as knobs.

Preferably, the bearing support has two adjacent receptacles for two bearings. In this case the elevation can form a common abutment surface for the circumferential ends of the snap rings of two adjacent outer rings.

It is further possible in this case that two spaced-apart elevations are disposed on the surface of the bearing support in the portion of a connecting bridge between the two receptacles.

In another aspect of the present teachings, the alignment element is formed as a projection that radially projects into the area of the receptacle, and the projection is designed to engage in the annular groove. In this case the projection is preferably made from the material of the bearing support and is manufactured in a plastic-deformation process.

In another aspect of the present teachings, the alignment element is manufactured as a separate component that is affixed to the bearing support. In this case the component can have at least two hook-shaped projections that are designed to engage in the annular groove. The component can be formed as a flat slide plate, a section of which, as defined by its breadth, is slidable in a supported manner into the circumferential area between two adjacent outer rings on the surface of the bearing support, which circumferential area is not filled by the snap rings. The bearing support can also have an attachment element, with which the component can be attached, in particular a bendable tab.

Retaining tabs can be disposed on the bearing support, which retaining tabs are bendable to encircle the snap ring, wherein the retaining tabs are disposed in a spaced manner, in particular, from the alignment element. Therefore, a captive and stable unit can be created.

The snap ring preferably extends over a circumferential angle between 320.degree. and 340.degree. On the one hand, a secure retention of the bearing on the bearing support is thus ensured; on the other hand, the snap rings are not in the way to advance the two adjacent bearings close to each other.

The bearing support preferably is comprised of metal plate or plastic.

With the proposed design, it is possible to provide a reliable anti-rotation-function for the snap ring in its annular groove, wherein it concerns a rotation about the rotational axis of the bearing.

Exemplary embodiments of the invention are illustrated in the drawings.

BRIEF DESCRIPTION OF THE DRAWINGS

FIG. 11 shows the bearing support in an exploded view together with two bearings according to the assembly of FIG. 1 according to a fourth embodiment of the invention, FIG. 12 shows the bearing support in a perspective view together with the two bearings in an already assembled state according to the fourth embodiment of the invention, FIG. 13 shows the bearing support according to FIG. 12 in a perspective view, as viewed from a somewhat different angle, FIG. 14 shows the bearing support in a perspective view together with the two bearings in an already assembled state according to a fifth embodiment of the invention.

DETAILED DESCRIPTION OF THE INVENTION

Figure 1:
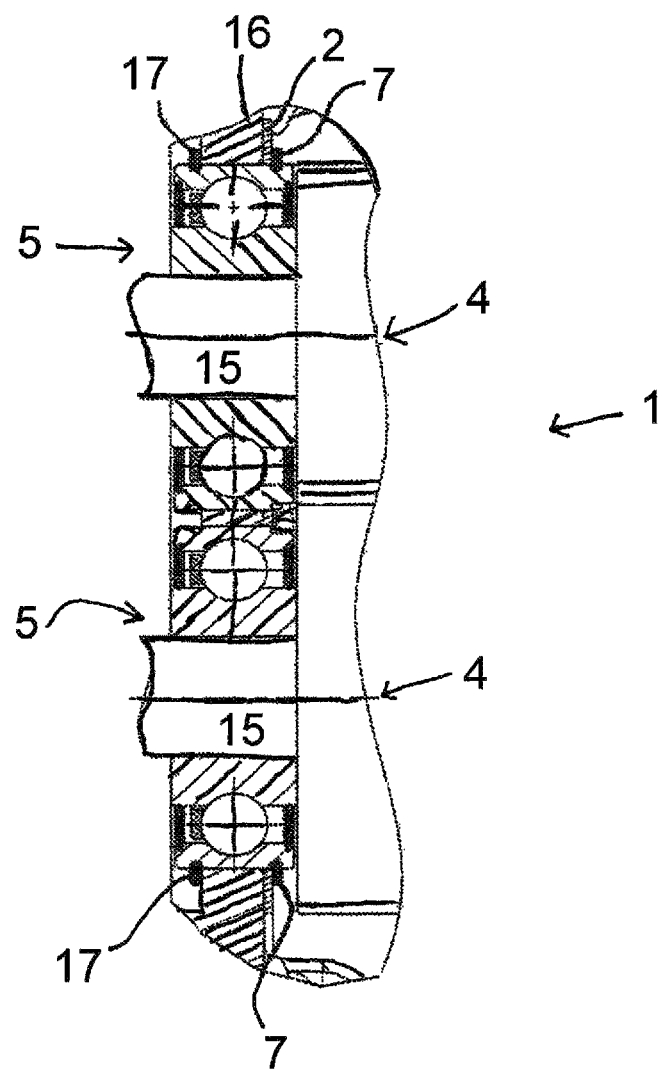
FIG. 1 shows a cut-out from a transmission housing in the radial cross-section, wherein a bearing support is illustrated together with two roller bearings.

In FIG. 1 a bearing assembly 1 can be seen, which comprises two bearings 5, which are utilized, e.g., to support two shafts 15 in a transmission of a motor vehicle. The rotational axis of the bearings 5 is marked with A. A securing of the bearings 5 in the housing 16 of the transmission is achieved by fixing the bearings 5 with snap rings 7 and 17 on both sides. Due to the small axial distance between the bearings 5, the snap rings 7 and 17 are formed so that they have a wide opening angle, i.e. they are forced open over a relatively large curved section, i.e. the snap rings 7, 17 extend about a circumferential range of significantly less than 360.degree., e.g., about 330.degree. Depending on an assembly process, it is required, if necessary, that the bearings 5 are preassembled in an additional component, e.g., made of metal plate, in the form of a bearing support 2 before the installation into the housing 16. In this case it makes sense to preassemble the bearings 5 in the bearing support 2 in a captive manner. Then, during the assembly of the transmission, the bearing support 2 has to be inserted at the appropriate location of the housing 16 along with the bearings 5 retained therein, wherein the bearings 5 are positioned directly in designated bearing bores (retention openings) in the housing 16. This significantly facilitates the actual installation process of the transmission.

Figure 2:
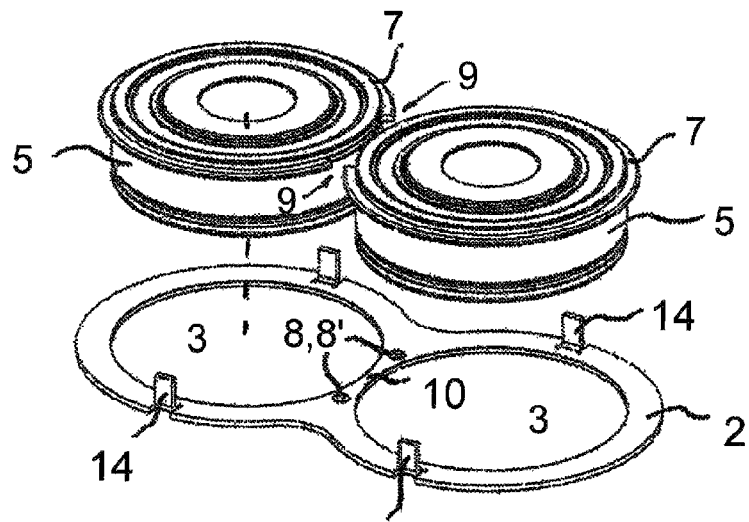
FIG. 2 shows the bearing support in an exploded view together with two bearings according to the assembly of FIG. 1 according to a first embodiment of the invention.
Figure 3:
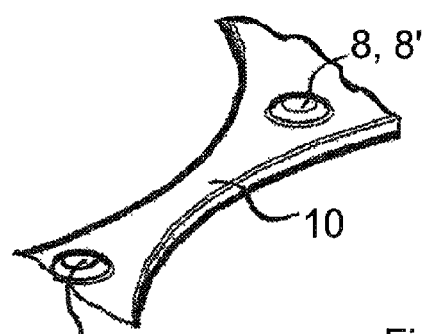
FIG. 3 shows an enlarged illustration of a section of the bearing support according to the first embodiment of the invention.

The bearing assembly, shown in FIG. 2 in a dismantled state, comprises a bearing support 2 (retainer) for the bearings 5, wherein additional components are provided in the form of alignment elements 8, e.g., made of metal plate or plastic, which alignment elements 8 are disposed on the connecting bridge 10 between the two receptacles 3. The bridge 10 therefore has elevations (outward shapes) 8 in the form of two knobs 8'. FIG. 3 shows a cut-out enlargement of the bridge 10 and of the knobs 8'. The bearing support 2 has a solid inner circumferential surface which directly abuts against the outer circumferential surface of the bearing 5, so as to locate the bearing 5 inside the bearing support 2.

Figure 4:
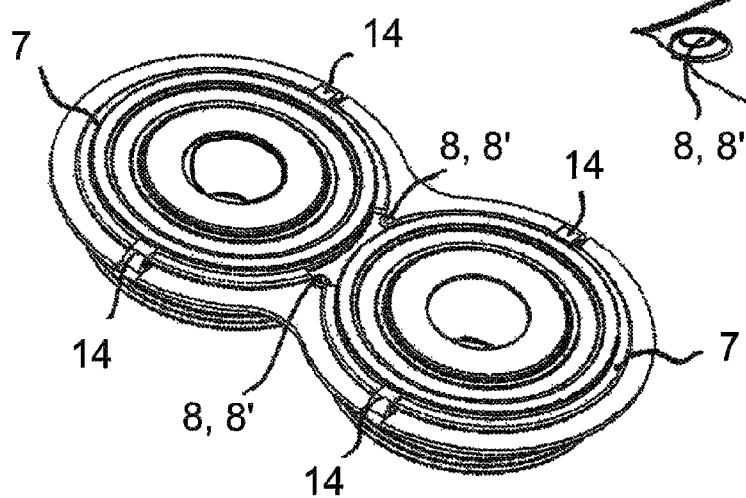
FIG. 4 shows the bearing support in a perspective view together with the two bearings in an already assembled state according to the first embodiment of the invention.
Figure 5:
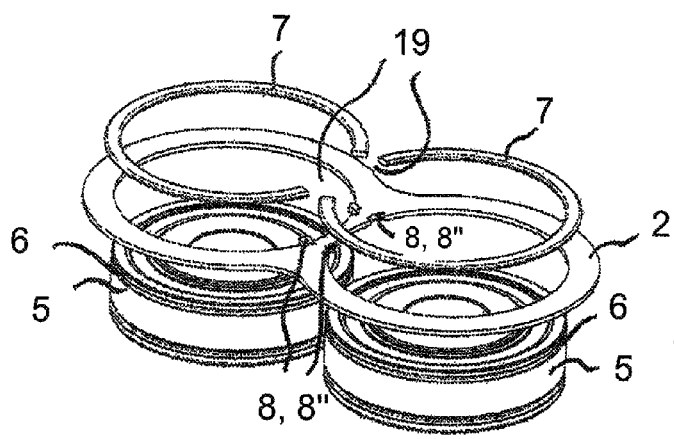
FIG. 5 shows the bearing support in an exploded view together with two bearings according to the assembly of FIG. 1 according to a second embodiment of the invention.

The outer rings 4 of the bearings 5 have radially-encircling annular grooves for receiving the snap rings 7, 17. Due to the small spacing of the bearings 5 in the bearing support 2, the snap rings 7, 17 are not formed in a completely radially-encircling manner, as was already mentioned. Before the installation in the bearing support 2, two snap rings 7 are already provided on the bearings 5 in order to fix the bearings 5 in the bearing support 2, the two snap rings 7 disposed directly and abutting on an outer surface of the bearing support 2 when the snap ring is engaged with the bearing 5 and the bearing 5 is fully inserted into the receptacle such that the snap ring is positioned on the outer surface of the bearing support 2. There are no grooves in the bearing support 2 for engaging the snap ring 7 that are positioned underneath the snap ring 7 in a direction parallel to a rotational axis of the at least one bearing 5 that is fully inserted into the at least one receptacle 3 and secured by the snap ring 7. For this purpose, the bearing support 2 has retaining tabs 14 attached on the circumference. After the oriented insertion of the bearings 5 with preassembled snap rings 7 into the bearing support 2, the tabs 14 are folded over the snap rings 7 as illustrated in FIG. 4. A captive transport is thereby ensured up to the installation of the bearing assembly into the transmission housing. The knobs 8' in the middle of the bearing support 2, which are located in the area of the snap ring openings, prevent the rotation of the snap rings 7. They thus form an abutment surface for the circumferential ends 9 of the snap rings 7.

Figure 6:
FIG. 6 shows an enlarged illustration of a section of the bearing support according to the second embodiment of the invention.
Figure 7:
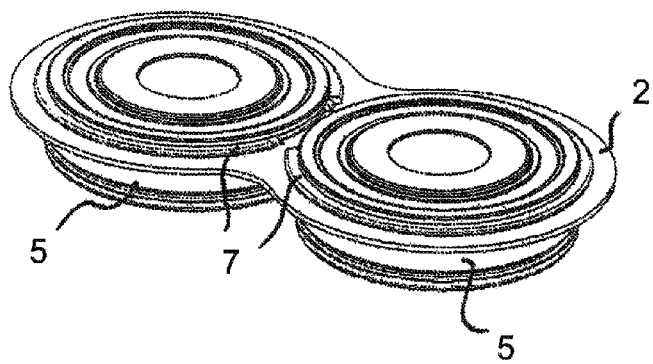
FIG. 7 shows the bearing support in a perspective view together with the two bearings in an already assembled state according to the second embodiment of the invention.
Figure 8:
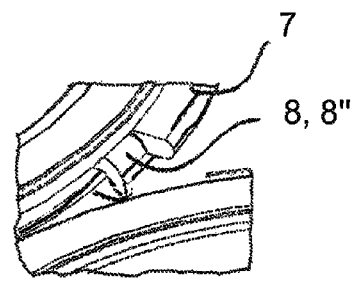
FIG. 8 shows an enlarged illustration of a section of the bearing support according to FIG. 7.

An alternative solution is illustrated in the FIGS. 5 to 8. Alignment elements 8 are formed in the form of projections 8" on the bridge 10 of the bearing support 2, which projections 8" form elastic snap elements. A cut-out enlargement is shown in FIG. 6. For the assembly, the bearings 5 are pushed from below into the bearing support 2, wherein the snap rings 7 are not yet mounted. When the bearing support 2 is pushed onto the bearings 5, the projections 8" snap around the bearings 5 into the annular grooves 6 for the snap rings 7. The snap rings 7 are snapped around the bearings 5 in an oriented manner, and in fact such that the projections 8" are located within the snap ring openings 19, whereby the rotation of the snap rings 7 is prevented, analogous to the function of the knobs 8' in FIG. 2. As illustrated in FIGS. 7 and 8, the bearings 5 are locked in the bearing support 2 in a captive manner.

Since the bearings 5 are secured only by the catch projections 8" (snap elements), a slight tilting of the bearings 5 can occur in this exemplary embodiment. If this should be prevented, a bendable tab can be attached opposite to the bridge 10 or in another portion of the snap rings 7 on the bearing support 2 in a manner analogous to the exemplary embodiment according to the FIGS. 2 to 4, so that the bearings 5 are firmly secured on the bearing support 2.

Figure 9:
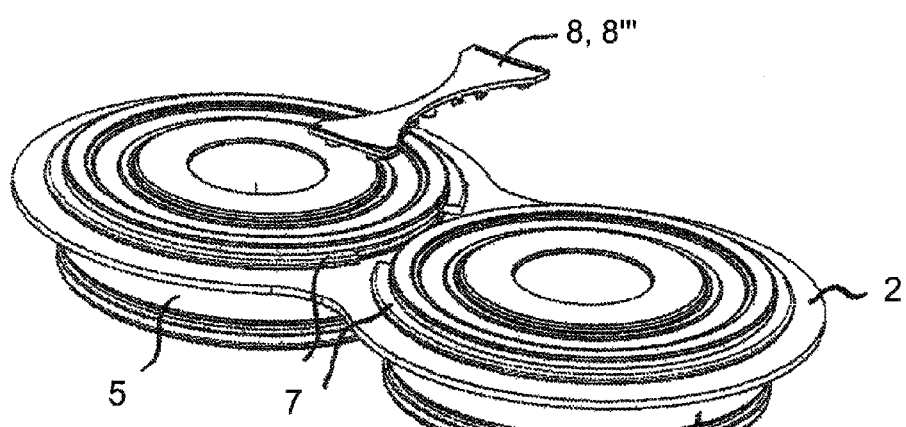
FIG. 9 shows the bearing support in a perspective view together with the two bearings in a nearly assembled state according to a third embodiment of the invention, wherein an alignment element is not yet disposed on the bearing support.
Figure 10:
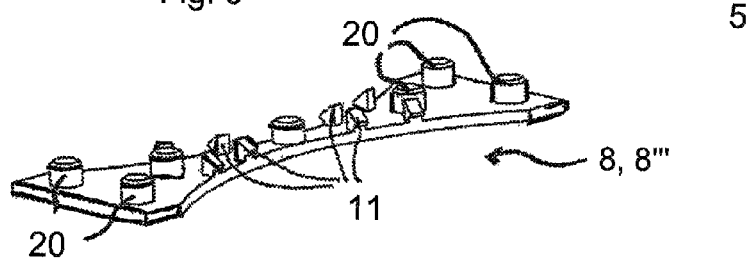
FIG. 10 shows the alignment element according to FIG. 9 in a perspective view, with its bottom side rotated upwards.

In FIG. 9, another alternative exemplary embodiment is illustrated, in which an alignment element 8 in the form of a component 8''' (retaining element) is positioned between the bearings 5 as a superimposed part. The component 8''' is illustrated in detail in FIG. 10 (with its bottom side facing upwards). The bearing support 2 for the bearings 5 is a simple metal plate or plastic part with two openings. The component 8''' has knobs 20 underneath that provide a defined distance to the upper surface of the bearing support 2. For the retention, the component 8''' has hook-shaped projections 11 (snap elements), which snap into the snap ring grooves of the outer rings of the two bearings 5 and thus fix the component 8''' on the bearing assembly. A rotation of the snap rings 7 is thus prevented.

FIGS. 11 to 14 illustrate another exemplary embodiment. An alignment element 8 in the form of a component 8'', formed as a slide plate, is provided between the bearings 5. FIG. 11 shows a partially assembled state with arrows that indicate the assembly process. FIGS. 12 and 13 show different views of the already-preassembled bearing assembly.

The component 8'' conforms at least partially to the curve of the bearings 5, wherein the minimal spacing of the bearings 5 is considered. It is pushed between the bearings 5 and engages in the snap ring grooves on the outer rings of the bearings 5. Due to the shape of the component 8'' (as a flat plate with width B in a segment 12 that fans out on its end surface), it is not completely pushable between and beyond the bearings 5. An attachment element 13 in the form of a retainer has a bent tab, into which the component 8'' is pushed and retained.

The parts are connected in a captive manner due to subsequent, oriented assembly of the snap rings 7. The snap rings 7 are slightly expanded for the purpose of the assembly and inserted into the snap ring grooves of the outer rings of the bearings 5. The openings of the snap rings 7 lie exactly in the area of the component 8'' and are thus retained in an anti-rotational manner, i.e. the component 8'' forms an abutment surface for the circumferential ends 9 of the snap rings 7, as in the above-described exemplary embodiments.

FIG. 14 shows an enhancement of the exemplary embodiment of the FIGS. 11 to 13. In addition to the retaining function for the bearings 5, the bearing support 2 has another angled tab 18 and an opening 21 that can fulfill functions in the transmission after the assembly, as is the case with well-known bearing supports. Appropriate functional elements can be also provided in the other exemplary embodiments.

Figure 15:
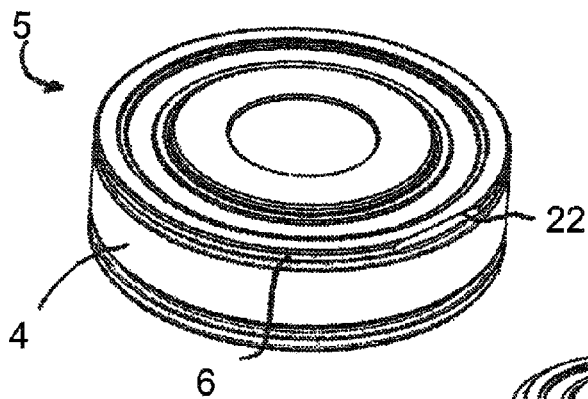
FIG. 15 shows a bearing according to the assembly of FIG. 1 in a perspective view.
Figure 16:
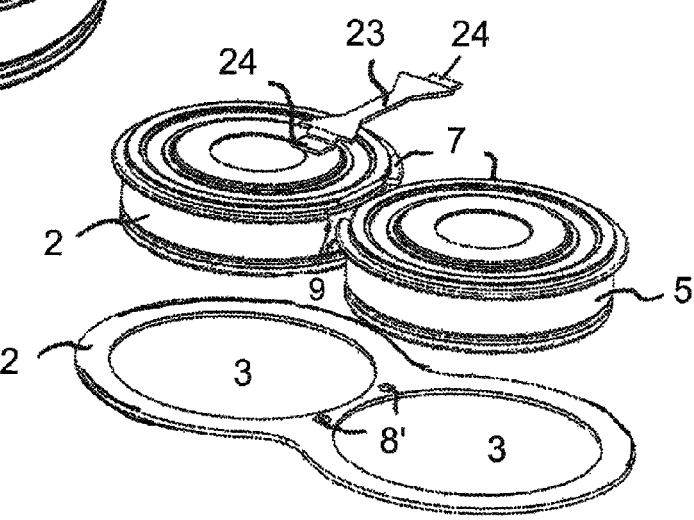
FIG. 16 shows the bearing support in an exploded view together with two bearings according to the assembly of FIG. 1 according to a sixth embodiment of the invention.

Additional functionality is illustrated in the FIGS. 15 to 19:

FIG. 15 illustrates a bearing 5. The bearing outer ring 4 is flattened on one side, i.e., in a circumferential position above the annular grove 6 for the snap ring 7, i.e. a recess 22 is introduced (e.g., milled in). As is illustrated in FIG. 16 and as was already described above, two bearings 5 can be installed in the bearing support 2 (retainer). For this purpose the bearing support 2 has two receptacles 3 for the respective bearing outer rings 4; the receptacles 3 primarily consist of a circular bore (punching) in the metal sheet of the bearing support 2.

On the other hand the bearing support 2 has the elevations 8' in the form of the knobs, which are disposed so that they— as was explained—form an abutment surface for the circumferential end 9 of the snap rings 7 in the circumferential direction and thus prevent a rotation of the snap rings 7.

During the assembly, the bearings 5 are inserted in an oriented manner into the bearing support 2. The snap rings 7 can be already preassembled. To prevent the rotation of the bearings 5, an engagement element 23 (additional element), preferably comprised of a metal sheet or plastic, is positioned in the area of the snap ring openings between the flattened outer rings. The engagement element 23 at least partially conforms to the contours of the outer rings in the area of the recess 22 and is preferably formed straight in the middle portion. The engagement element 23 thus has abutment surfaces that are congruent to the shape of the recesses 22 of the outer rings 4.

Figure 17:
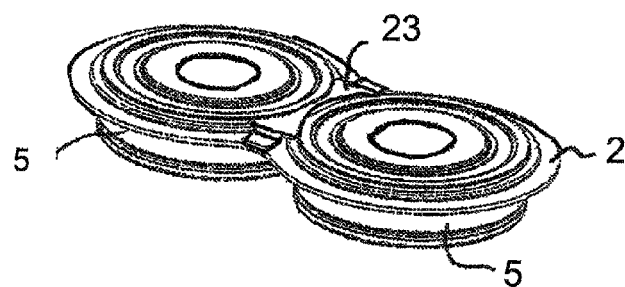
FIG. 17 shows the bearing support in a perspective view together with the two bearings in an already assembled according to the sixth embodiment of the invention.

The end surface of the engagement element 23 has an attachment device 24 in the form of deformable retaining projections that can be retained in corresponding retaining brackets on the bearing support 2 by bending (which is not depicted). FIG. 17 shows the preassembled bearing assembly ready to be installed into the housing.

Figure 18:
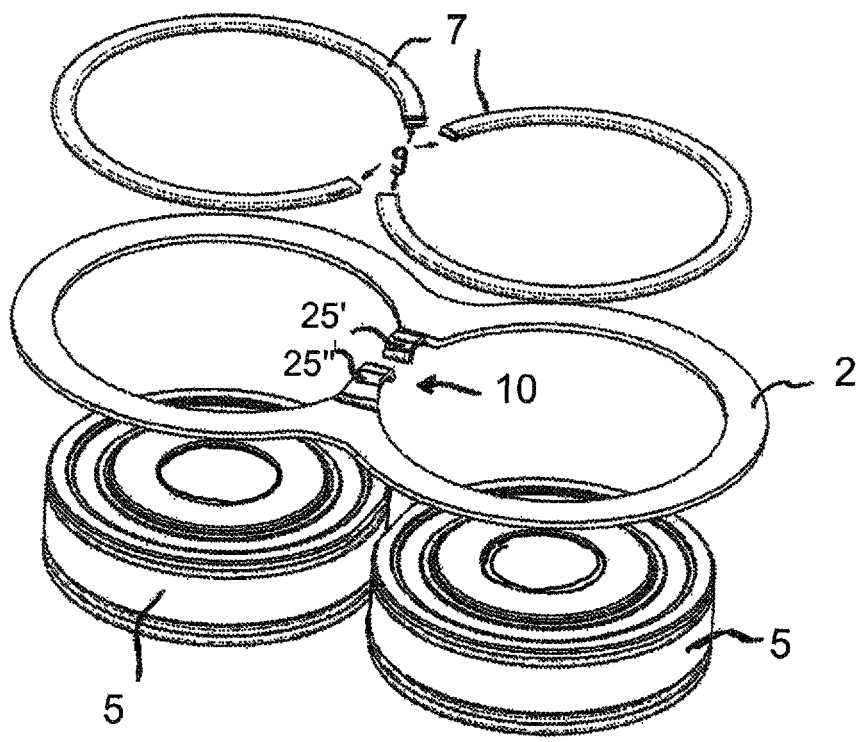
FIG. 18 shows the bearing support in an exploded view together with two bearings according to the assembly of FIG. 1 pursuant to a seventh embodiment of the invention and FIG. 19 shows the bearing support in a perspective view together with the two bearings in an already assembled according to the seventh embodiment of the invention.
Figure 19:
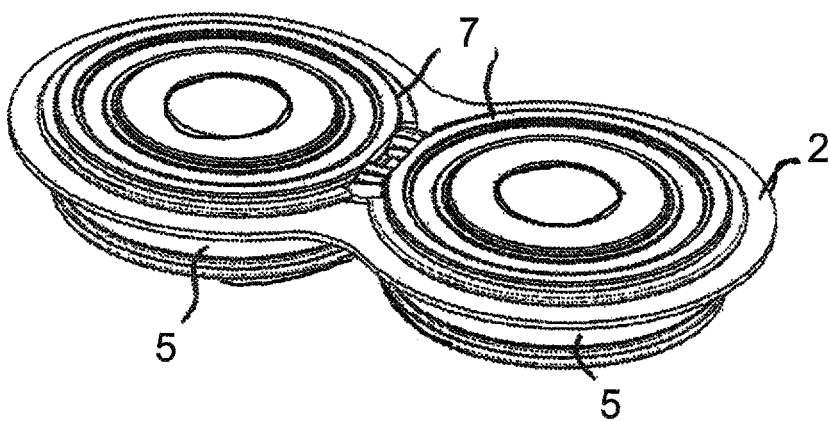

An alternative exemplary embodiment is shown in FIGS. 18 and 19. The bridge 10 of the bearing support 2 is implemented in a snapped-open manner (i.e. separated), which bridge 10 results as a consequence of the receptacles 3, whereby two tab-like subcomponents 25' and 25'' are present. The subcomponents 25', 25'' are slightly curved outwards out of the plane of the bearing support 2. They each are curved in such a way that a hook-shaped end portion is present. The subcomponents 25', 25'' are dimensioned in such a way that they extend into the recesses 22 of the outer rings 4 in assembled bearings 5 and thus prevent a rotation of the outer rings 4 relative to the bearing support 2 about the rotational axis A of the bearings 5. Since the subcomponents 25', 25'' rise continuously out of the bearing support 2, they also prevent the rotation of the snap rings 7 and therefore provide the functions of the above discussed alignment elements 8.

A captive retention of the bearings 5 on the bearing support 2 is provided by the snap rings 7. The above-described embodiments of the invention were explained for these desirable functionalities, in addition to the anti-rotation function of the snap rings and the anti-rotation function of the bearing outer rings.

It is also possible to combine the anti-rotation function of the snap rings with the anti-rotation function of the bearing rings or to implement them separately. The anti-rotation function of the outer bearing rings and the anti-rotation function of the snap rings, as well as the captive retention of the snap rings can thus be combined in an advantageous manner, so that all described requirements can be fulfilled at a relatively low production cost. However, it is also possible to provide bearing assemblies that have only one of the functions, i.e. captive retention function and/or anti-rotation function of the bearings 5 and/or of the snap rings 7 by appropriately designing the bearing supports.

REFERENCE NUMBER LIST 1 bearing assembly
2 bearing support
3 receptacle
4 outer ring
5 bearing
6 annular groove
7 snap ring
8 alignment element
8' elevation (knobs)
8'' projection (catch projection)
8''' component (superimposed part)
8'''' component (slide plate)
9 circumferential end
10 connecting bridge
11 hook-shaped projection
12 section of the component 8''''
13 attachment element
14 retaining tab
15 shaft
16 housing
17 snap ring 18 tab
19 snap ring opening
20 knobs
21 opening
22 recess
23 engagement element
24 attachment element
25' tab-like subcomponent
25" tab-like subcomponent
A rotational axis
B breadth

The invention claimed is:

1. A bearing assembly comprising:
at least one bearing having at least one outer ring with at least one annular groove defined therein along an outer circumferential surface,
a bearing support having at least one receptacle configured to receive the at least one outer ring, the bearing support having an inner circumferential surface that defines the at least one receptacle, the inner circumferential surface being configured to be adjacent to and continuously extend along the outer circumferential surface of the at least one bearing such that the inner circumferential surface is free of grooves therein capable of receiving a snap ring, the bearing support having an outer surface configured to receive the snap ring thereon,
the snap ring inserted into the at least one annular groove and axially fixing the at least one outer ring relative to the bearing support, and
the snap ring abutting the outer surface of the bearing support when the snap ring is engaged with the at least one bearing and the at least one bearing is fully inserted into the at least one receptacle such that the snap ring is positioned on the outer surface of the bearing support, no grooves are present in the bearing support for engaging the snap ring,
at least one alignment element disposed on the bearing support, the at least one alignment element retaining the snap ring relative to the bearing support at a defined angle relative to the rotational axis of the at least one bearing, wherein the at least one alignment element is formed as an elevation disposed on a surface of the bearing support and forms an abutment surface for a circumferential end of the snap ring, and wherein the elevation is formed as knobs.

2. The bearing assembly according to claim 1, wherein the bearing support has two adjacent receptacles for two bearings.

3. The bearing assembly according to claim 2, further comprising at least two elevations disposed on the surface of the bearing support, each forming an abutment surface for respective circumferential ends of snap rings of two adjacent outer rings.

4. The bearing assembly according to claim 2, wherein two spaced-apart elevations are disposed on a connecting bridge between the two receptacles on the surface of the bearing support.

5. The bearing assembly according to claim 1, wherein the snap ring extends over a circumferential angle between 320° and 340°.

6. The bearing assembly according to claim 1, wherein the bearing support is comprised of metal plate or plastic.

7. A bearing assembly comprising:
at least one bearing having at least one outer ring with at least one annular groove defined therein,
a bearing support having at least one receptacle configured to receive the at least one outer ring,
a snap ring inserted into the at least one annular groove and axially fixing the at least one outer ring relative to the bearing support, and
at least one alignment element disposed on or in the bearing support, the alignment element retaining the snap ring relative to the bearing support at a defined angle relative to the rotational axis of the at least one bearing, wherein the alignment element is formed as a projection that radially projects toward the at least one receptacle and engages in the annular groove.

8. The bearing assembly according to claim 7, wherein the projection is made from the material of the bearing support and is manufactured by a plastic-deformation process.

9. The bearing assembly according to claim 7, wherein the alignment element is a separate component affixed on the bearing support.

10. A bearing assembly comprising:
at least one bearing having at least one outer ring with at least one annular groove defined therein,
a bearing support having at least one receptacle configured to receive the at least one outer ring,
a snap ring inserted into the at least one annular groove and axially fixing the at least one outer ring relative to the bearing support, and
at least one alignment element formed by a separate component affixed on the bearing support, the alignment element retaining the snap ring relative to the bearing support at a defined angle relative to the rotational axis of the at least one bearing, wherein the component has at least two hook-shaped projections designed to engage in the annular groove.

11. A bearing assembly comprising:
at least two bearings each having an outer ring with at least one annular groove defined therein, two adjacent outer rings being formed by the positioning of the at least two bearings adjacent to each other,
a bearing support having at least two receptacles each configured to receive the outer ring of one of the at least two bearings,
each of the at least two bearings having a snap ring inserted into the at least one annular groove therein and axially fixing the outer ring of one of the at least two bearings relative to the bearing support, and
at least one alignment element formed by a separate component affixed on the bearing support, the alignment element retaining the snap ring relative to the bearing support at a defined angle relative to the rotational axis of the at least one bearing, wherein the separate component is formed as a flat slide plate, a section of which, as defined by its breadth (B), is slidable in a supported manner into the circumferential area between the two adjacent outer rings on the surface of the bearing support, which circumferential area is not filled with the snap rings.

12. The bearing assembly according to claim 11, wherein the bearing support has an attachment element attached to the separate component.

13. A bearing assembly comprising:
at least one bearing having at least one outer ring with at least one annular groove defined therein,
a bearing support having at least one receptacle configured to receive the at least one outer ring,
a snap ring inserted into the at least one annular groove and axially fixing the at least one outer ring relative to the bearing support, and
at least one alignment element disposed on or in the bearing support, the alignment element retaining the snap ring relative to the bearing support at a defined angle relative to the rotational axis of the at least one bearing, wherein retaining tabs are disposed on the bearing support and are bendable to encircle the snap ring, wherein the retaining tabs are disposed in a spaced manner from the alignment element.

* * * * *